United States Patent Office 2,741,552
Patented Apr. 10, 1956

2,741,552

METHOD OF MAKING BRIQUETTES FOR THE PRODUCTION OF MAGNESIUM

Harold Alfred Timm, Westmeath, Ontario, Canada, assignor to Dominion Magnesium Limited, Toronto, Ontario, Canada, a corporation of Canada No Drawing. Application September 5, 1952, Serial No. 308,169

3 Claims. (Cl. 75—3)

This invention relates to the production of biquettes for use in the extraction of magnesium by the thermal reduction of magnesia-containing material with ferrosilicon.

In the production of magnesium by thermal reduction with ferrosilicon, magnesia-containing material in finely divided form is mixed with finely divided ferrosilicon and the mixture is pressed into briquettes which are heated in a retort under greatly reduced pressure conditions. The magnesia-containing material is obtained by calcining magnesium ore or rock. In the production of briquettes for this purpose water has been added directly to the magnesia-containing material before it is briquetted.

It has now been found that substantially improved results are obtained when water is added directly to the finely divided ferrosilicon before the latter is mixed with the magnesia-containing material preparatory to briquetting.

In accordance with the present invention water is added to and mixed with the finely divided ferrosilicon to uniformly wet the particles and thereafter the wetted particles of ferrosilicon are uniformly mixed with the finely divided magnesia-containing material and the mixture is briquetted in the usual way. In practice the water is conveniently added to the fine ferrosilicon as the latter is fed from storage to the briquette weight hopper.

Several important advantages flow from this prewetting of the ferrosilicon. In relation to the mass of briquettes to be charged into the reducing furnace there is substantially less dust or loose magnesia-ferrosilicon-containing material to be lost in handling the briquettes before they reach the furnace. There is a uniformly closer contact between the particles of the reducing agent and the magnesia to be reduced because the fine magnesia-containing material readily adheres to the wet particles of ferrosilicon until the mass is pressed into stable form. It is easy to control the amount of water incorporated in the briquettes to the specific amount required by the material under treatment and thus avoid at any time unnecessarily increasing the load on the pumps used in providing the reduced pressure required in the reduction furnace or retort.

The factors by which briquette quality is evaluated are bulk density, apparent density and rattler test. The latter identifies the amount of fines, dust or loose material formed on the tumbling of a specific weight of briquettes in a closed cylinder fitted with two baffles for a given period of time. The amount of fines produced is reduced by the present method to the greatest extent when the loss on ignition of the calcine used is smallest. As an illustration when the loss on ignition of the calcine material was 0.5% the fines produced in the rattler test were reduced by substantially 25% and when the loss on ignition was 0.6% the reduction in fines produced was substantially 18%. The bulk density is generally lower but little difference appears in the apparent density.

The method makes it possible to closely control the moisture addition in conformity with the loss on ignition character of the calcine material and thus control the quality of the briquettes. This substantially eliminates any chance of excess moisture in the briquettes with the adverse effects on vacuum control during reduction of the magnesia.

The free water in the briquettes tends to render the briquettes porous as the moisture is released and removed during heating to reduce the magnesia and volatilize the magnesium. This appears to facilitate the reaction and increase the yield.

The increase in yield of magnesium metal produced from briquettes prepared as described is the most important consideration. In the example above given when the loss on ignition of the calcine was 0.5% the increase in yield was 4.3% over that obtained when no water was added.

It is preferable that the magnesia-containing material itself be free from moisture. The water in the briquetted mass may be within 0.5 to 3% by weight but is preferably 0.75 to 1.5% by weight. The preferred amount of water to be mixed with the ferrosilicon is 2 to 5% by weight but it may vary between 1 to 15% depending upon the proportion of ferrosilicon in the mixture.

In all other respects the method of briquetting is the same as that normally used. That is to say the pressures employed, the proportions of calcined rock and reducing agent are not changed.

It is known that ionization and electron transfer are favoured by a reducing atmosphere. Decomposition of water within the briquette by reaction with silicon produces hydrogen thus promoting an early reducing atmosphere. It appears that these factors promote the reducing reaction and thus increase the yield of metal.

What is claimed is:

1. A method of producing briquettes of magnesia-containing material and ferrosilicon for use in the thermal extraction of magnesium which comprises uniformly wetting finely divided particles of ferrosilicon with water, mixing the wetted particles with finely divided magnesia-containing material substantially free from water and forming the mass into briquettes.

2. In the making of briquettes for the production of magnesium, the method which comprises uniformly wetting finely divided particles of ferrosilicon with water, mixing the wetted particles with dry calcined finely divided magnesium ore, the amount of water mixed with the ferrosilicon being such as to provide 0.5 to 3% by weight of water in the mixture, and pressing the mass into briquette form.

3. The method defined in claim 1 wherein 2 to 5% of its weight of water is mixed with the ferrosilicon.

References Cited in the file of this patent
UNITED STATES PATENTS

| | | |
|---|---|---|
| 2,390,016 | Wagner et al. | Nov. 27, 1945 |
| 2,393,080 | Waring | Jan. 15, 1946 |
| 2,435,495 | Dick | Feb. 3, 1948 |